Nov. 24, 1936.  E. LANTO  2,062,096
AXLE CONSTRUCTION
Original Filed April 9, 1931   2 Sheets-Sheet 1
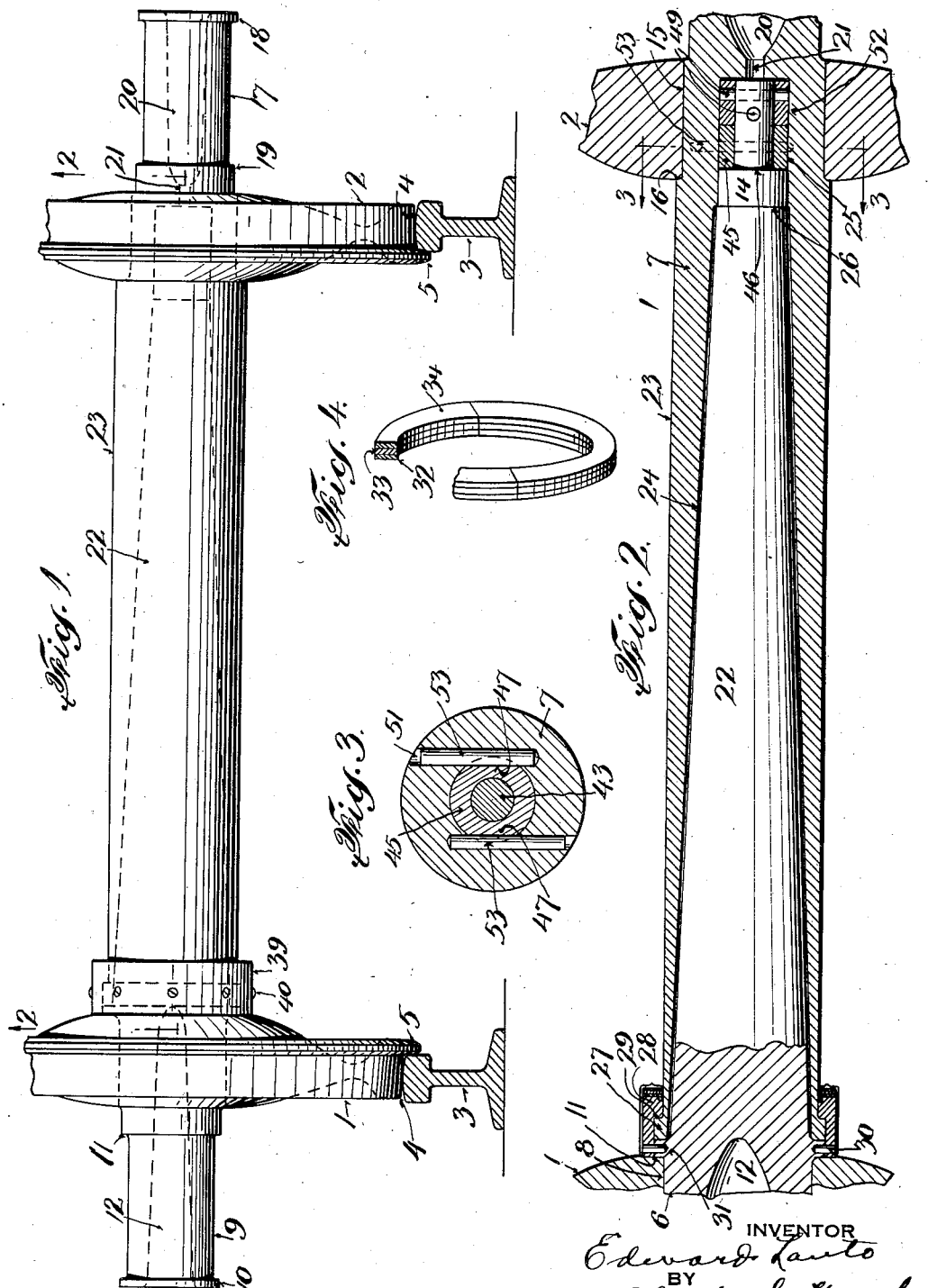
INVENTOR
Edward Lanto
BY
Charles G. Hewsley
ATTORNEY Nov. 24, 1936.  E. LANTO  2,062,096
AXLE CONSTRUCTION
Original Filed April 9, 1931   2 Sheets-Sheet 2
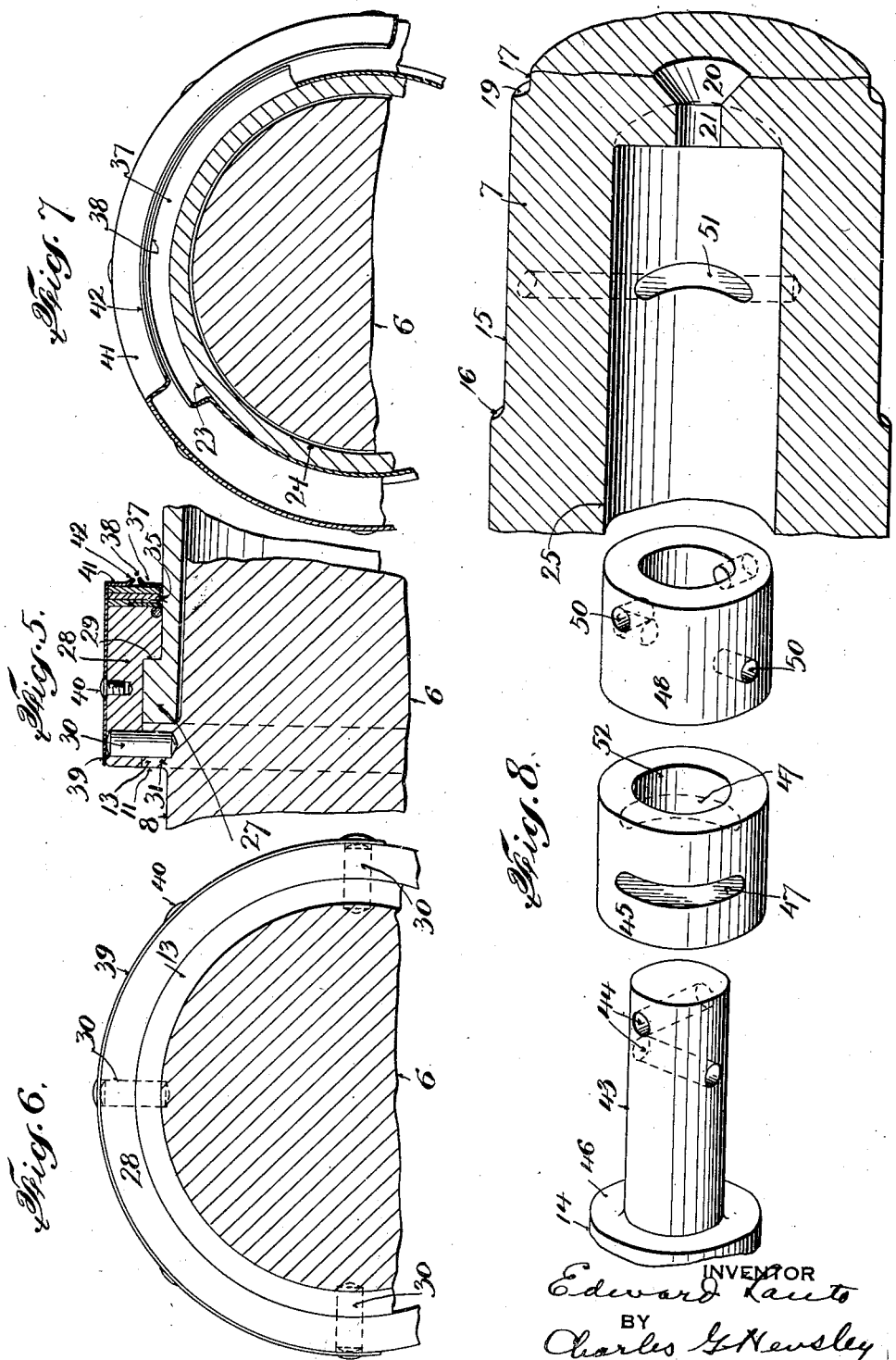
INVENTOR
Edward Lanto
BY
Charles G. Hensley
ATTORNEY Patented Nov. 24, 1936

2,062,096

UNITED STATES PATENT OFFICE 2,062,096

AXLE CONSTRUCTION

Edward Lanto, New York, N. Y.

Application April 9, 1931, Serial No. 528,776
Renewed May 1, 1936

11 Claims. (Cl. 295—37)

My invention relates to axle construction and while not limited in application to axles for particular types of vehicles, nevertheless its widest application will be realized in connection with railway rolling stock. I will show and describe my invention as applied to railway practice with the understanding, however, that the invention may be employed for any type of vehicle.

In railway rolling stock the wheels of each pair are generally so fixed to the axle on which they are mounted that the two wheels and the axle are rigid in relation to each other; or in other words, neither wheel can turn without the axle turning with it, and naturally both wheels must turn together and at the same rate of speed. Where a pair of wheels rigidly joined to their axle travel around curves, the wheel which moves around the larger arc or outer rail of the track must travel farther than the wheel which engages the inner rail. At present there is no way of compensating for this difference in travel of the two wheels so that either one or both of the wheels must slip in relation to the rail on which it rests.

The action may result in the wheel which engages the inner rail of the curve travelling at a higher speed than the movement of that particular wheel along the rail, in which case the wheel may have a forward slip.

On the other hand, the wheel on the outer rail of the curve may have a backward slip in relation to that rail. In any condition one or both of the wheels must slip in relation to the track because the wheels and axle are rigidly connected.

To some extent the same condition is present while the wheels are travelling along a straight track because of slight differences in the positions of the rails, because of irregularities, and because, in some cases, of slight differences in the circumference of the two wheels. Whatever the cause may be at any particular moment for the wheels to move at relatively different speeds, there is no way of compensating for the difference in travel of the two wheels and there must be either a forward or rearward slip of one or both wheels.

This results in considerable wear on the rails as well as upon the wheels and it has a tendency to create what is known as a "flat" wheel. The grinding action of the wheels upon the rails at curves is evident from the fact that the rails of a curve wear down very rapidly as compared with the straight rails of the track. There is not only a great waste due to wear on the wheels and tracks, but considerable power is consumed in driving or hauling the rolling stock, due to the fact that the wheels and their axle are rigidly connected.

One of the principal objects of my invention is to provide an axle construction wherein the axle is made of two main sections which are relatively revolvable in relation to each other, although otherwise moving as if they were a single body; and in attaching the two wheels of a pair to the respective members of the axle.

By reason of the fact that the axle members are relatively revolvable the wheels of the pair may revolve in relation to each other so that either wheel may at any time travel faster or farther than the other wheel of the pair in order that the slipping action in relation to the rails referred to above will be entirely eliminated.

Thus, when the pair of wheels travel around a curve, the outer wheel, i. e., the one engaging the outer rail of the track, may travel at a speed necessary to correspond with the length of that particular rail, while the wheel which engages the inner rail may travel at a speed necessary to conform to the length of such rail. Neither wheel is dependent upon or controlled by the speed of the other wheel of the pair at any time. In this way the usual grinding action of the wheels on the rails while travelling around curves is eliminated and as a result both the wheels and tracks will wear much longer than under standard practice.

The present device also avoids the tendency of the wheels to leave the rails especially when rounding curves, and this advantage is also obtained by reason of the fact that each wheel of the pair may run independently of the other.

In the ordinary type of wheel and axle construction the weight of the car or other body is usually applied to the axles immediately outside of the wheels. In this case the wheels act as points of fulcrum and the downward pressure of the weight of the body upon the ends of the axles tends to bend the middle portion of the axle upwardly and in fact it actually causes a bend in the axle of appreciable extent.

There is considerable torque exerted on the axle, especially by the slipping action on the rails above described, so that the distortion or bending of the axle due to the application of the weight of the body and the torsional stresses exerted on the axle causes crystallization of the axle which is more serious at about the middle thereof. This crystallizing action often results in the breaking of the axle with serious consequences.

In the present construction the axle is composed, as above stated, of two members. One of these members lies within the other, constituting male and female members. One of the wheels is attached or affixed to the male member, whereas the other wheel is attached to or fixed upon the female member but instead of the axle acting as two short levers approximately half the length of the axle with the wheels as fulcrums, in the present construction the leverage is approximately doubled. That is to say, the arm of the lever represented by the portion of the axle lying between the wheels is made approximately twice as long as in standard practice, so that the pressure on the ends of the respective axle sections is less than the upward pressure at the middle of the ordinary axle. As stated, one wheel is attached to the male member and this member, in addition to the end which projects outside of the wheel to support a part of the weight of the body, also extends from the wheel to which it is attached or approximately to the other wheel of the pair, so that the arm of the lever represented by this axle member lying between the wheels is approximately the distance between the pair of wheels.

Likewise, the female member of the axle comprises not only the portion which projects outside of the wheel to receive part of the weight of the car body, but it also extends from the wheel to which it is attached or nearly to the opposite wheel of the pair, this axle member enclosing or surrounding the interior or male section. In the case of the female member the leverage corresponds with that of the male member so that the upward pressure exerted at the extreme ends of the axle sections is much less than the upward pressure at the middle of the ordinary type of axle. The torsional stresses ordinarily applied to the standard axle and which are greatest at the middle, are entirely eliminated in the present device because the axle sections with their respective wheels may freely revolve in relation to each other, athough otherwise travelling as a unit.

In the preferred construction both axle sections are tapered in thickness in order that the overall diameter of the axle as a whole may be retained as near as possible to the proportions of the standard axle. In addition, this permits the axle to conform as near as possible to the weight of the present or standard axle for any given type of vehicle. The tapering of the sections of the axle may and preferably does correspond with the strength requirements of the axle at different points. That is to say, the overlapping portions of the axle sections are thickest or strongest where the stresses are greatest, and conversely are thinner where the stresses are less. This results in maximum strength where needed and with a total size and weight as low as possible for a given load.

Another object of my invention is to provide locking means for connecting the axle sections so that they will not contract or expand axially in relation to each other but may revolve freely in relation to each other. The locking means is strong and dependable as well as inexpensive to manufacture.

Another object of the invention is to provide a dust guard to prevent dust from entering between the axle sections. Another object is to provide means for supplying oil necessary to lubricate the parts.

The faces of the railway wheels are slightly coned and with the natural motions of the train one wheel will often engage near the fillet while the other wheel travels on the outer portion of the face, in which case the wheels are operating on different diameters, which results in some slippage in relation to the rail. In the present case, however, this slippage is avoided because the wheels may travel at respectively different speeds.

There is less journal friction in the present construction because there is no distortion of the axle. A train equipped with the present invention may be started more smoothly and with less force than required to start a similar train with the standard axle construction and it may be operated around curves with about the same force as on straight tracks.

Other features of my invention will be set forth in the following detailed description.

In the drawings forming part of this application,

Figure 1 is a front elevation of a pair of wheels and an axle embodying my invention, Figure 2 is a sectional view taken on the line 2—2 of Figure 1, Figure 3 is a sectional view taken on the line 3—3 of Figure 2, Figure 4 is a perspective view of the packing used in the dust guard, with parts broken away, Figure 5 is an enlarged sectional view of portions of the axle and dust guard, Figure 6 is a view looking at the left hand end of the parts shown in Figure 5, Figure 7 is a sectional view looking at the right hand end of the parts shown in Figure 5, and Figure 8 is a view showing part of the axle in section and parts of one of the locking devices in perspective, about to be assembled.

In the drawings I have shown a pair of wheels 1 and 2 adapted to travel on the rails 3. These wheels are shown as of the ordinary or standard construction although any type of wheel may be used as far as the present invention is concerned. The faces of the wheels as shown at 4 are slightly tapered or coned in accordance with standard practice, and the flanges 5 of the respective wheels engage the inner sides of the tracks. The axle consists primarily of the male member 6 and the female member 7.

The male member has a cylindrical portion 8 on which is mounted the wheel 1 by any well known process such as by forcing it by a hydraulic press. My invention permits the wheel to be applied to this axle section by any of the well known methods formerly employed to attach the standard wheels to standard axles. Whatever method is employed, the wheel becomes firmly attached to the axle section so that they move as if integral. One end of this axle section projects beyond the wheel 1 to form the portion 9 which fits within the axle box (not shown).

The ordinary brasses in the axle box are adapted to encircle the portion 9 of the axle section and to be retained against longitudinal displacement by the flange 10 on the end of the axle section and by the shoulder 11. The weight of the vehicle body applied to one end of the axle therefore rests upon the portion 9 which is near to but outside the vertical plane of the wheel 1. Preferably, the axle section 6 is provided with a central and tapered bore 12 although this portion may be solid if desired.

Just inside the inner face of the wheel 1 the axle section 6 is provided with a projection or flange 13 and from this projection the axle section is tapered in diameter with the larger diameter adjacent the flange 13 and gradually decreasing in diameter to or near the opposite end or to the cylindrical bearing 14. Beyond the tapered portion I prefer to form the cylindrical or substantially cylindrical portion 14 which forms a bearing member co-operating with the outer or female axle section.

The female axle section 7 has a cylindrical portion 15 onto which the opposite wheel 2 is attached also by any well known method such as by pressing, so that this wheel and the female axle section are rigidly connected and move as a unit. I have shown a slight shoulder 16 on the exterior of the axle section 7 against which the inner surface of the wheel 2 may abut. The portion of this axle section which projects beyond or outside of the wheel 2 is provided with a cylindrical portion 17 to receive and co-operate with the brasses of the axle box (not shown) and the brasses are adapted to engage between the end flange 18 and the shoulder 19.

The weight of the vehicle body applied to this end of the axle is applied to the projecting end 17 outside of but adjacent the wheel 2. The portion of the axle section extending beyond the wheel is preferably provided with a tapered bore 20 and with an aperture 21 communicating with this tapered bore to serve as an oil feed as hereinafter described.

The portion of the axle section 7 which spans the space between the pair of wheels is made hollow so that it fits over and encloses the portion 22 of the male axle section. The outer periphery 23 of the female axle section may be, and preferably is, of uniform diameter throughout, but the inner bore 24 is tapered throughout the greater portion of the axle section. The portion 25 of the axle section 7 is cylindrical or substantially so, and from the shoulder 26 at the end of this cylindrical portion the bore 24 is tapered to the left hand end in Figure 2, and at this latter end a flange 27 is formed which is adapted to abut against the flange 13 of the male axle section and to form part of a locking device to be hereinafter described.

Preferably, there is a clearance or space between the inner tapered bore 24 of the female axle section and the periphery of the tapered portion 22 of the other axle section so that throughout the tapered portions the two axle sections are not in frictional contact.

I have shown two separate devices for locking the axle sections against relative endwise movement, one of these devices being applied adjacent one wheel and the other applied adjacent the opposite wheel. Both of these devices may be used in the same construction if desired or either of the devices may be used alone and will suffice to lock the axle sections against relative endwise movement but permit them to revolve in relation to each other.

The locking device shown in the left hand portion of Figure 2 is as follows: There is an annular ring 28 provided with a shoulder 29 and this ring fits over the cylindrical portion 23 of the member 7, and it rests against the flange 27. This ring projects over the flange 27 on the member 6 and in line with the latter the ring is provided with a number of apertures through which the locking pins 30 may be inserted to extend into apertures 31 formed in the flange 13.

I provide means for positively locking these pins in place and also serving as a dust and oil guard.

At the right hand end of the ring 28 in Figures 2 and 5 I have shown a series of washers lying face to face against each other. The washers 32, 33, which may be and preferably are formed of felt, are arranged against one end of the ring 28 and there is an outer washer 34 preferably made of leather, lying against the washer 33. There is a guard ring 35 which extends under the inner edges of the several washers; and outside of the washer 34 the ring extends upwardly as shown at 37 and is provided with an outturned lip 38.

There is a guard member 39 of ring shape fitting around the outside of the ring member 28 and it is attached thereto by screws 40 extending through the member 39 and threaded into the ring 28. This guard member covers the locking pins 30 so that these latter pins cannot withdraw from their locking positions.

The guard member 39 has a wall or flange 41 turned downwardly and lying against a portion of the outer surface of the washer 34 and it also has an outturned lip 42 lying close to the lip 38.

The locking device arranged at the right hand end of the axle as shown in Figure 2 consists of the following: The right hand end of the axle member 6 is turned down beyond the bearing portion 14 to a reduced diameter, as shown at 43 in Figures 2 and 8, and this reduced portion is provided with two apertures 44 extending therethrough and preferably arranged at right angles to each other. There is a sleeve 45 also shown in Figures 2 and 3 which is adapted to fit over the reduced end 43 of the axle section 6 and to rest against one end of the bearing member 14 in which position of the sleeve it will lie inside of the apertures 44; that is to say, between the shoulder 46 and these apertures. This sleeve is provided with slots 47, there being two shown in the drawings arranged on opposite sides of the sleeve. There is another sleeve 48 shown in Figures 2 and 8, which also fits over the end of the reduced portion 43 of the axle section 6 and it is adapted to abut against the sleeve 45 for the purpose of locking the latter in position. The pins 49 extend through the aligning apertures 50 in the last mentioned sleeve and through the apertures 44 in the section 43 of the axle section 6.

I have shown two apertures 51 bored into the axle member 7 and intersecting the bore 52 from opposite sides. These apertures are inserted locking pins 53 which extend through the grooves 47 in the sleeve member 45 for the purpose of locking this sleeve against endwise movement on the member 43.

In assembling these parts both sleeves 45 and 48 will be placed on the reduced portion 43 of the male axle section and the pins 49 will be inserted into the apertures 50 of the sleeve 48 and in the apertures 44 of the axle section, so that both sleeves will be locked on this reduced portion of the axle section before the male and female axle sections are assembled. The pins 53 will be inserted into the apertures 51 for the purpose of locking the sleeve 45 after the axle sections have been assembled. The parts just described lock the two axle sections against endwise displacement in relation to each other so that they cannot separate while they are in service. It will be apparent that the sleeve member 45 may revolve on the reduced portion 43 of the axle between the bearing section 14 and the end sleeve 48 so that this locking device does not prevent the axle sections from revolving in relation to each other.

*Operation*

When the device is assembled, as shown in Figures 1 and 2, the pair of wheels and the axle will be assembled with the car truck the same as the standard wheels and axle, the axle boxes being mounted on the portions of the axle which project beyond the wheels the same as in standard practice. When the weight of the car body rests on the two axle boxes and the weight is applied to the projecting ends 9, 17 of the axle there are in effect two levers contained within the axle. For instance, the male axle section constitutes a lever having its fulcrum in the wheel 1 the shorter arm of the lever being represented by the projecting end 9 of the axle which lies outside of the wheel.

The other arm of this lever is represented by the tapered portion 22 of the axle section which has a bearing at the portion 14 within the female member and adjacent to or partly within the opposite wheel 2. The female axle section also constitutes a lever, the shorter arm of which is represented by the portion 17 of the axle extending to the right of the wheel 2, the lever having its fulcrum in the wheel 2. The other or longer arm of this lever is represented by the cylindrical portion 23 which encloses the portion 22 of the other axle section and which longer arm has its bearing at the left hand end as viewed in Figure 2. The longer arms of these respective levers extend substantially the distance between the pair of wheels. In standard practice the axle is represented by two levers, the longer arms of which are equal to about one-half the distance between the pair of wheels. This increase in the length of the longer arms of the levers in the present system decreases the tendency of the axle to bulge or flex near the center, so that in actual operation there will either be no deflection of the axle between the wheels or if there is, it will be negligible when compared with the deflection in standard practice. The tapering in thickness of the member 22 of one axle section as well as the tapering of the member 23 of the other axle section may be made in accordance with the stresses applied to the different portions of these members. By tapering these members in their cross sectional thickness it is possible to obtain the necessary strength at different points in proportion to the stresses and at the same time obtain a strong axle approximately within the limits of the standard one-piece axle.

When the wheels and axle are in operation the wheels and the axle sections to which they are respectively attached may revolve in respect to each other.

The wheel 1 being fixed to the male axle section 6, these two members always revolve together. The wheel 2 on the other hand being fixed to the male axle section 7, these two parts revolve together. But the male and female axle sections may revolve in relation to each other because the locking devices, while holding the axle sections against longitudinal separation, do not interfere with their revolving with relation to each other. Therefore, as the wheels travel along the track, each may revolve with its respective axle section at the same rate as the opposite wheel, and its axle section, or the two wheels and their respective axle sections may revolve at relatively different speeds. Therefore, in travelling around curves or even while travelling on a straight track the wheels of the pair may revolve without control by or restraint from the companion wheel of the pair. This will eliminate the obstacles mentioned in the preamble. It will eliminate all the torsional strain upon the axle heretofore caused by the tendency of one wheel to move at a different speed than the other. This factor eliminates the tendency of the axle to crystallize especially at its middle portion.

Oil from one of the journal boxes may enter through the bore 20 in the right hand end of the female axle section and it may pass through the aperture 21 and work in between the members 22, 23 of the axle sections and lubricate all points of contact between these sections. This oil is prevented from leaking out by the packing washers 32, 33, 34. The dust cap represented by the members 35, 39 will serve to keep dust and dirt from entering the space between the flange 27 and the locking ring 28.

In this manner the axle sections are lubricated by oil received from one of the axle boxes and the device is maintained substantially dustproof.

Having described my invention, what I claim is:

1. The combination of a plurality of members fitting one within the other and adapted to revolve in relation to each other, the inner member having a shoulder, and means for connecting said members to prevent longitudinal displacement of one in relation to the other while permitting them to revolve, including a plurality of sleeve members fitting onto the exterior of said first members and co-operating with said shoulder, means for locking one of said sleeve members onto said interior member whereby the second sleeve member is confined between said first sleeve member and said shoulder, and adapted to revolve, and means engaging the outer of said first mentioned members and engaging said second mentioned sleeve to prevent longitudinal movement of said second sleeve in relation to said outer member.

2. The combination of a plurality of axle members fitting one within the other and adapted to revolve in relation to each other, and means connecting said members to prevent longitudinal displacement of one in relation to the other while permitting them to revolve, including a plurality of sleeve members fitting onto the inner axle member, one of said sleeves having a member extending therethrough and into said inner axle member to lock said sleeve against longitudinal movement thereof, a second sleeve revolvably mounted on said inner axle member and confined in one direction by said first sleeve, means for engaging said revolvable sleeve on the opposite side to said first sleeve to prevent movement of said second mentioned sleeve in one direction, and means inserted into said outer axle member and passing through a portion of said second mentioned sleeve to lock the same against relative longitudinal movement in relation to said outer axle member for permitting said second mentioned sleeve to revolve in relation to said first axle member.

3. The combination of a plurality of axle members fitting one within the other and adapted to revolve in relation to each other, said inner axle member having a shoulder, a sleeve mounted on said inner axle member, a pin passing through said sleeve and said inner axle member and confined within said outer axle member, a sleeve mounted between said first sleeve and said shoulder to revolve on said first axle member and to be confined against longitudinal movement thereon by said first sleeve and said shoulder, said second mentioned sleeve having a groove therein and a member insertable into said outer axle member and engaging in said groove to prevent longitudinal movement of said second sleeve in relation to the outer axle member.

4. In an axle the combination of a plurality of axle sections having portions extending one within the other and adapted to revolve in relation to each other, said inner axle member having a shoulder against which one end of the outer axle section is adapted to engage, said outer axle section having a flange adjacent said shoulder, a ring surrounding said axle and having a shoulder co-operating with the shoulder of said outer axle section, said ring projecting over the shoulder member of said inner axle section, and locking means projecting through said ring and extending into said inner axle section whereby said axle sections are locked against longitudinal displacement, a locking plate extending around said ring and secured thereto and adapted to hold said locking means in place.

5. In an axle, the combination of a plurality of axle sections having portions extending one within the other, and adapted to revolve in relation to each other, said inner axle section having a shoulder against which one end of the outer axle section is adapted to engage, said outer axle section having a flange adjacent said shoulder, a ring surrounding said axle and having a shoulder co-operating with the shoulder of said outer axle section, said ring projecting over the shoulder member of said inner axle section and provided with locking means engaging said inner axle section to lock the axle sections against longitudinal displacement, an annular locking plate encircling said ring and attached thereto, said plate having a portion extending inwardly adjacent one end of said ring and dust excluding means arranged between the latter portion of said locking ring and said ring.

6. The combination of a pair of spaced wheels and an axle on which said wheels are mounted, said axle comprising sections disposed one within the other and adapted to revolve in relation to each other, one of said wheels being rigidly mounted on each of said axle sections to revolve therewith, said axle sections each graduated in thickness between the pair of wheels, the thickest portion of each axle section disposed toward the wheel to which it is fixed, said axle sections each spanning the space between the pair of wheels, said inner axle section having a bearing portion extending to or within the plane of the hub of the wheel opposite the one to which the respective axle section is attached and terminating in the plane of said opposite wheel, said axle section having a load carrying portion extending outwardly beyond the wheel base, and said outer axle section extending to a point adjacent the hub of the wheel which is attached to said inner axle section, said outer axle section extending outwardly beyond the wheel base to form a single load supporting member.

7. The combination of a pair of spaced wheels and an axle on which said wheels are mounted, said axle comprising sections disposed one within the other and adapted to revolve in relation to each other, one of said wheels being rigidly mounted on each of said axle sections to revolve therewith, said axle sections each graduated in thickness between the pair of wheels, the thickest portion of each axle section disposed toward the wheel to which it is fixed, said axle sections each spanning the space between the pair of wheels, said inner axle section having a bearing portion extending to or within the plane of the hub of the wheel opposite the one to which the respective axle section is attached and terminating in the plane of said opposite wheel, said axle section having a load carrying portion extending outwardly beyond the wheel base, and said outer axle section extending to a point adjacent the hub of the wheel which is attached to said inner axle section, said outer axle section extending outwardly beyond the wheel base to form a single load supporting member and means in the hub of the wheel attached to said outer axle section for locking the axle sections against end thrust.

8. The combination of a pair of spaced wheels and an axle on which said wheels are mounted, said axle comprising sections disposed one within the other and adapted to revolve in relation to each other, one of said wheels being rigidly mounted on each of said axle sections to revolve therewith, said axle sections each graduated in thickness between the pair of wheels, the thickest portion of each axle section disposed toward the wheel to which it is fixed, said axle sections each spanning the space between the pair of wheels, said inner axle section having a bearing portion extending to or within the plane of the hub of the wheel opposite the one to which the respective axle section is attached and terminating in the plane of said opposite wheel, said axle section having a load carrying portion extending outwardly beyond the wheel base, and said outer axle section extending to a point adjacent the hub of the wheel which is attached to said inner axle section, said outer axle section extending outwardly beyond the wheel base to form a single load supporting member, and means within the hub of the wheel attached to said outer axle section for preventing end thrust between said axle sections and means adjacent the hub of the wheel to which the inner axle section is attached for preventing end thrust between said axle sections.

9. The combination of a pair of spaced wheels and an axle on which said wheels are mounted, said axle comprising sections disposed one within the other and adapted to revolve in relation to each other, one of said wheels being rigidly mounted on each of said axle sections to revolve therewith, said axle sections each graduated in thickness between the pair of wheels and the outer section having a bore parallel with the periphery of the inner axle section but lying out of contact with said inner axle section for a greater portion of its length, the thickest portion of each axle section disposed toward the wheel to which it is fixed, said axle sections each spanning the space between the pair of wheels, said inner axle section having a bearing portion extending to or within the plane of the hub of the wheel opposite the one to which the respective axle section is attached and terminating in the plane of said opposite wheel, said axle section having a load carrying portion extending outwardly beyond the wheel base and said outer axle section extending to a point adjacent the hub of the wheel which is attached to said inner axle section, said outer axle section extending outwardly beyond the wheel base to form a single load supporting member.

10. The combination of a pair of spaced wheels and an axle on which said wheels are mounted, said axle comprising sections disposed one within the other and adapted to revolve in relation to each other, one of said wheels being rigidly mounted on each of said axle sections to revolve therewith, said axle sections each so graduated in thickness between the pair of wheels that the strength of the axle sections at various points along the length corresponds with the distribution of load forces at the respective points, the thickest portion of each axle section disposed toward the wheel to which it is fixed, said axle sections each spanning the space between the pair of wheels, said inner axle section having a bearing portion extending to or within the plane of the hub of the wheel opposite the one to which the respective axle section is attached and terminating in the plane of said opposite wheel, said axle section having a load carrying portion extending outwardly beyond the wheel base, and said outer axle section extending to a point adjacent the hub of the wheel which is attached to said inner axle section, said outer axle section extending outwardly beyond the wheel base to form a single load supporting member.

11. The combination of a pair of spaced wheels and an axle on which said wheels are mounted, said axle comprising sections one of which consists of a solid tapered member and the outer section of tubular construction and tapered in thickness, said sections adapted to revolve in relation to each other, one of said wheels being rigidly mounted on each of said axle sections to revolve therewith, the thickest portion of each axle section being disposed adjacent the wheel to which it is fixed, said axle sections each spanning the space between the pair of wheels, said inner section having a bearing portion extending to or within the plane of the wheel opposite the one to which the respective axle section is attached, and terminating in the plane of said opposite wheel, said latter axle section having a load carrying portion extending outwardly beyond the wheel base, and said outer axle section extending to a point adjacent the hub of the wheel which is attached to said inner axle section, said outer axle section extending outwardly beyond the wheel base to form a single load supporting member.

EDWARD LANTO.